United States Patent
Nishihara et al.

(10) Patent No.: US 7,853,152 B2
(45) Date of Patent: Dec. 14, 2010

(54) SIGNAL REGENERATION DEVICE, OPTICAL RECEIVER, AND SIGNAL PROCESSING METHOD

(75) Inventors: Masato Nishihara, Kawasaki (JP); Tomoo Takahara, Kawasaki (JP); George Ishikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 881 days.

(21) Appl. No.: 11/387,936

(22) Filed: Mar. 24, 2006

(65) Prior Publication Data
US 2007/0127929 A1 Jun. 7, 2007

(30) Foreign Application Priority Data
Dec. 2, 2005 (JP) ............................. 2005-349406

(51) Int. Cl.
*H04B 10/02* (2006.01)
(52) U.S. Cl. ................... 398/175; 398/155; 398/161
(58) Field of Classification Search ......... 398/202–214, 398/155, 161, 175
See application file for complete search history.

(56) References Cited

U.S. PATENT DOCUMENTS

| 7,215,721 | B2 * | 5/2007 | Hietala et al. ............... 375/317 |
| 7,421,210 | B2 | 9/2008 | Miyazaki | |
| 2003/0002121 | A1 | 1/2003 | Miyamoto et al. | |
| 2004/0081470 | A1 | 4/2004 | Griffin | |
| 2004/0208647 | A1* | 10/2004 | Gill et al. .................... 398/188 |
| 2004/0213579 | A1* | 10/2004 | Chew et al. .................. 398/183 |
| 2005/0117915 | A1 | 6/2005 | Miyazaki | |
| 2006/0019627 | A1* | 1/2006 | Talbot ........................ 455/296 |
| 2007/0047971 | A1* | 3/2007 | Ikeuchi ....................... 398/202 |

FOREIGN PATENT DOCUMENTS

| JP | 2000-59300 | 2/2000 |
| JP | 2000-151505 | 5/2000 |
| JP | 2003-87201 | 3/2003 |
| JP | 2003-92553 | 3/2003 |
| JP | 2005-167474 | 6/2005 |
| JP | 2005-252369 | 9/2005 |
| JP | 2005-260696 | 9/2005 |

OTHER PUBLICATIONS

Japanese Patent Office Action mailed Aug. 31, 2010 for corresponding Japanese Patent Application No. 2005-349406.

* cited by examiner

*Primary Examiner*—Dzung D Tran
(74) *Attorney, Agent, or Firm*—Staas & Halsey LLP

(57) ABSTRACT

A signal regeneration device which makes an extracted clock signal highly accurate while maintaining superior receiving sensitivity. To this end, a device of the present invention is configured to have a branch section for branching an input electrical signal which has been demodulated from a differential phase-shift modulated state; a first filter for equalizing a waveform of one of the demodulated electrical signals branched by the branch section; a clock recovery section for recovering a clock signal from the demodulated electrical signal whose waveform has been equalized by the first filter; and a data regeneration section for regenerating a data signal from a remaining one of the demodulated electrical signals branched by the branch section and from a clock signal recovered by the clock recovery section.

11 Claims, 10 Drawing Sheets

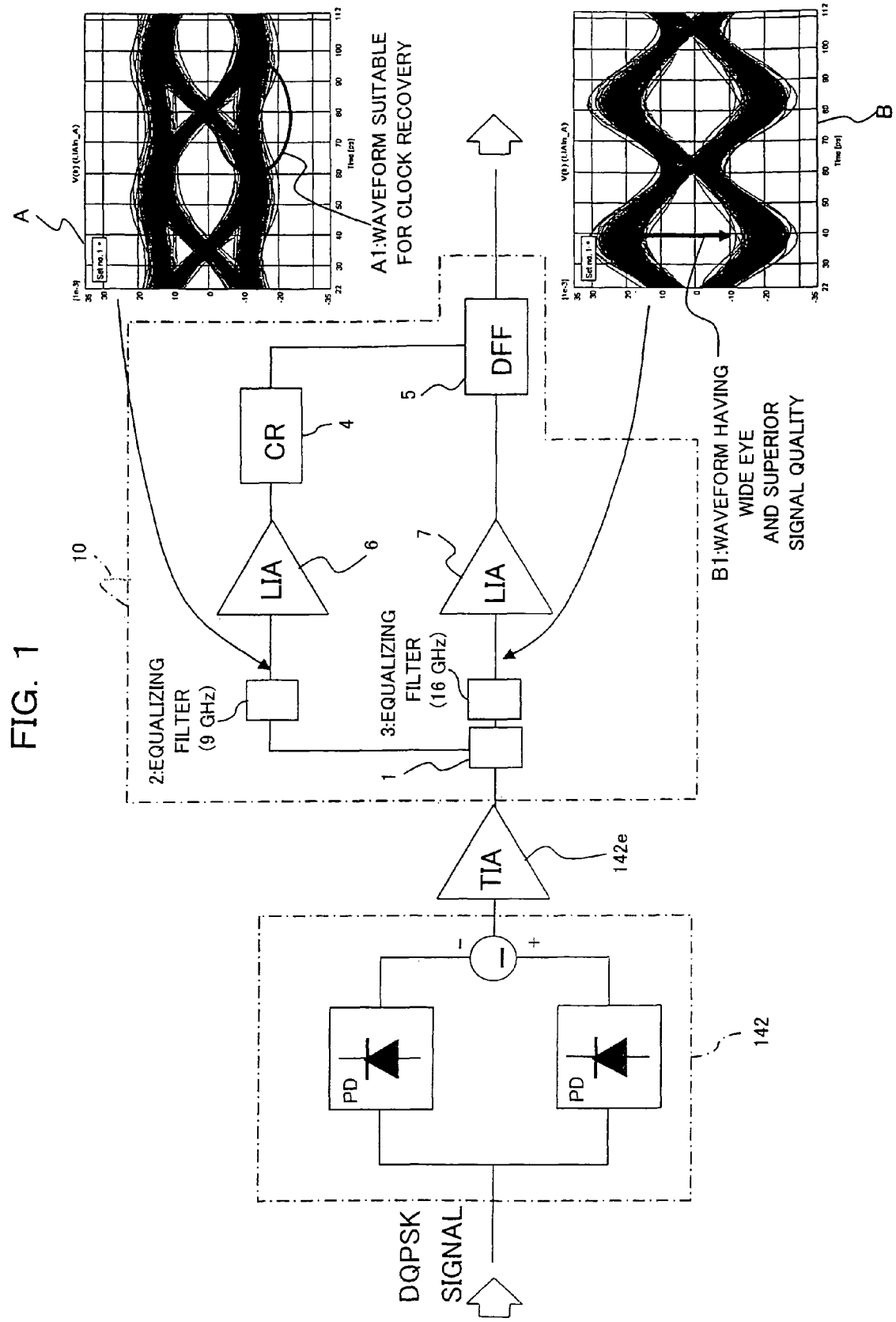

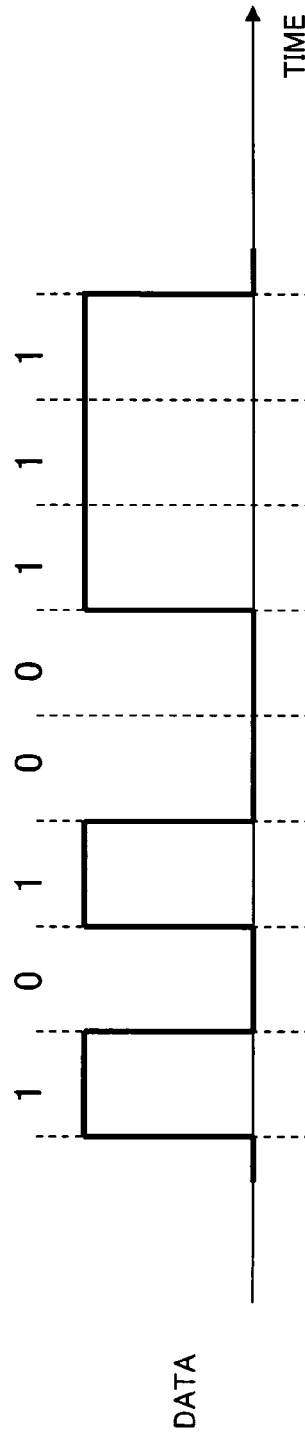
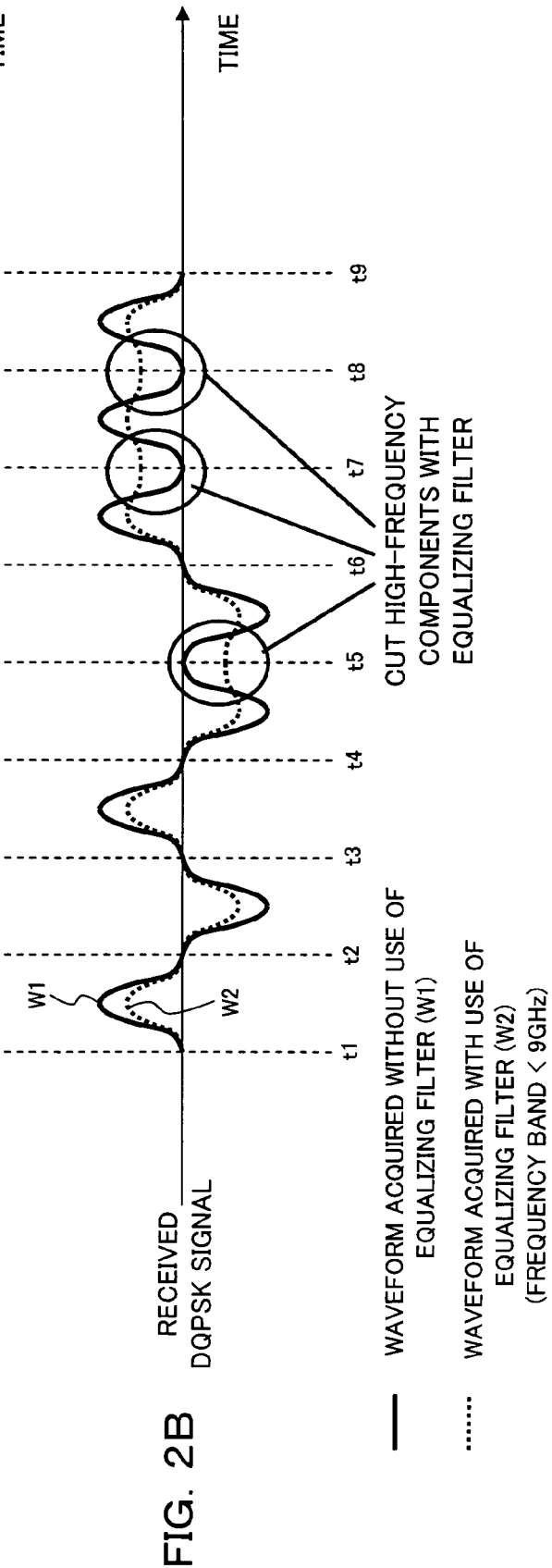
FIG. 2A
FIG. 2B
— WAVEFORM ACQUIRED WITHOUT USE OF EQUALIZING FILTER (W1)
······ WAVEFORM ACQUIRED WITH USE OF EQUALIZING FILTER (W2) (FREQUENCY BAND < 9GHz)

WAVEFORM ACQUIRED WITHOUT
USE OF EQUALIZING FILTER

WAVEFORM ACQUIRED WITH USE OF EQUALIZING FILTER
(FREQUENCY BAND OF 16 GHz)

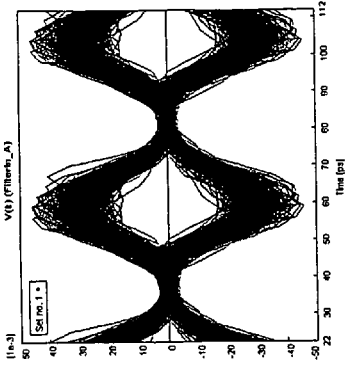
FIG. 4A  FIG. 4B  FIG. 4C  FIG. 4D
INPUT TO FILTER
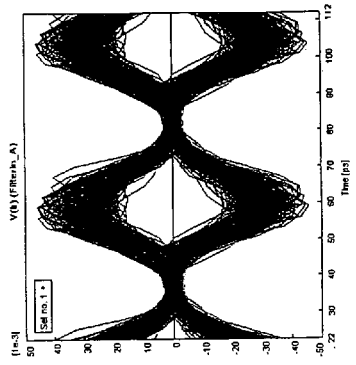
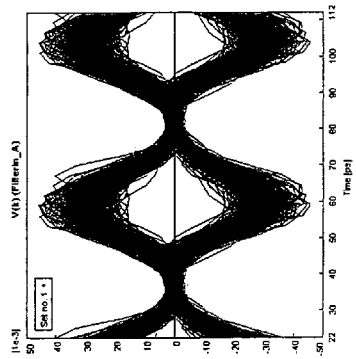
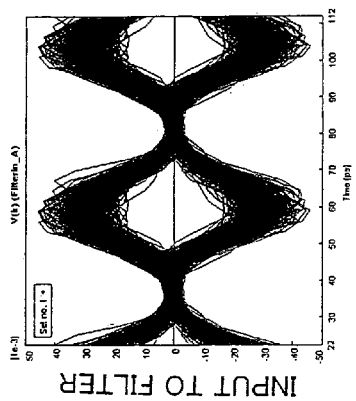
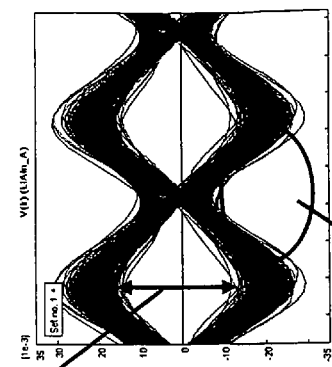
FIG. 5A  FIG. 5B  FIG. 5C  FIG. 5D
FREQUENCY BAND OF 9 GHz / FREQUENCY BAND OF 12 GHz / FREQUENCY BAND OF 14 GHz / FREQUENCY BAND OF 16 GHz
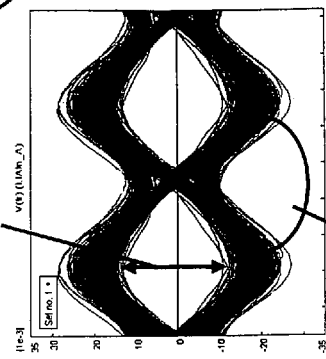
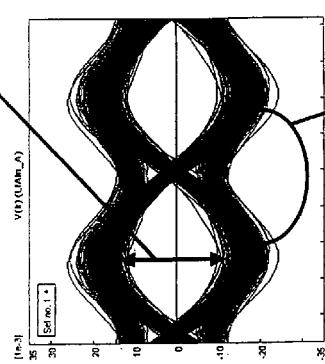
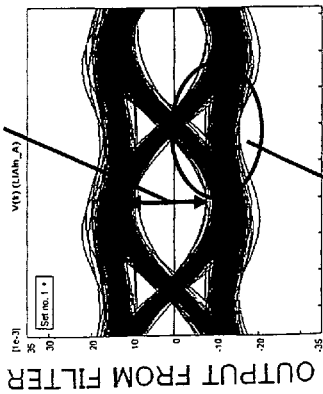
OUTPUT FROM FILTER

FIG. 7

| | NRZ | Duobinary | CS-RZ | RZ-DPSK | RZ-DQPSK |
|---|---|---|---|---|---|
| OPTICAL NOISE TOLERANCE | POOR | POOR | FAIR | GOOD | VERY GOOD |
| WAVELENGTH DISPERSION TOLERANCE | FAIR | GOOD (IN LINEAR DOMAIN) | FAIR | FAIR | GOOD |
| PMD TOLERANCE | POOR | FAIR | FAIR | FAIR | GOOD |
| OPTICAL NONLINEAR TOLERANCE | FAIR | POOR | GOOD | GOOD | GOOD |
| OADM FILTER PASSAGE TOLERANCE | GOOD | VERY GOOD | FAIR | FAIR | VERY GOOD |
| CONFIGURATION (SIZE/COST) | SMALL | LARGE | MIDDLE | LARGE | LARGE |

SIGNAL REGENERATION DEVICE, OPTICAL RECEIVER, AND SIGNAL PROCESSING METHOD

BACKGROUND OF THE INVENTION

1) Field of the Invention

The present invention relates to a signal regeneration device, an optical receiver, and a signal processing method suitably used for receiving a differential phase-shift keying modulated optical signal.

2) Description of the Related Art

Recently, there has been growing demand for introduction of a 40 Gbit/s optical transmission system as the next generation optical transmission system. Moreover, a transmission distance and a spectral efficiency, which are equal to those of a 10 Gbit/s system, are sought. Brisk research and development is being carried out, as means for achieving the transmission distance and the spectral efficiency, in relation to an RZ-DPSK (Differential Phase-Shift Keying) or a CSRZ-DPSK modulation scheme, which is superior to an NRZ (Non-Return to Zero) modulation scheme used in a conventional system of 10 Gb/s or less in terms of optical-signal-to-noise (OSNR) tolerance and non-linear tolerance.

Moreover, in addition to research and development on the above-described modulation scheme, brisk research and development is also being carried out in relation to a phase modulation scheme, such as an RZ-DQPSK or CSRZ-DQPSK (Differential Quadrature Phase-Shift Keying) modulation scheme having a feature of narrow spectrum (high-spectral efficiency). FIG. 7 is a comparative chart showing general characteristics of a duo-binary modulation scheme and a CS-RZ modulation scheme, along with the above-described NRZ modulation scheme, the RZ-DPSK modulation scheme, and the RZ-DQPSK modulation scheme.

FIG. 8 is a block diagram showing an example configuration of an optical transponder system 100A which transmits and receives an optical signal by adoption of a 40 Gb/s RZ-DPSK or CSRZ-DPSK modulation scheme. The optical transponder system 100A shown in FIG. 8 has an optical transmitter 110 for transmitting an optical signal in accordance with the RZ-DPSK modulation scheme or the CSRZ-DPSK modulation scheme, and an optical receiver 120 for performing receiving operation, such as demodulation of an optical signal transmitted from the optical transmitter 110. When an optical signal is transmitted or received in accordance with the RZ-DPSK or CSRZ-DPSK modulation-and-demodulation scheme, intensity of the optical signal is modulated by a 40-GHz clock waveform, and data are superimposed on a binary optical phase.

Here, the optical transmitter 110 shown in FIG. 8 comprises a transmission data processing section 111, a CW (Continuous Wave) light source 112, a phase modulator 113, and an RZ pulse generation intensity modulator 114. The transmission data processing section 111 performs a function as a framer for generating, e.g., an OTN (Optical Transport Network) frame from input data and another function as an FEC (Forward Error Correction) encoder for imparting an error correction code. Further, the transmission data processing section 111 performs a function as a DPSK precoder for effecting encoding operation which is reflected to a difference between a code of a current bit and a code of a one-bit-preceding bit.

The phase modulator 113 modulates continuous wave light output from the CW light source 112 by use of encoded data from the transmission data processing section 111, and outputs an optical signal whose light intensity is constant but carries data in the binary optical phase; namely, a DPSK modulated optical signal. Moreover, the RZ pulse generation intensity modulator 114 forms an RZ pulse from the optical signal output from the phase modulator 113. Especially, an optical signal converted into an RZ pulse through use of a clock drive signal, whose frequency is the same (40 GHz) as that of a bit rate and which has an amplitude that is substantially an extinction voltage (Vπ), is called an RZ-DPSK signal. An optical signal converted into an RZ pulse through use of a clock drive signal, whose frequency (20 GHz) is half that of the bit rate and which has an amplitude that is substantially double the amplitude of the extinction voltage (Vπ), is called a CSRZ-DPSK signal (A1, A2 shown in FIG. 8).

The optical receiver 120 is connected to the optical transmitter 110 by way of a transmission path 101, and receives the (CS)RZ-DPSK signal to thus process the received signal. The optical receiver 120 comprises a delay interferometer 121, a photoelectric conversion section 122, a regeneration circuit 123, and a received data processing section 124.

The delay interferometer 121 is formed from, e.g., a Mach-Zehnder interferometer, and causes interference (delayed interference) between an one-bit-delayed (CS)RZ-DPSK signal—and the (CS)RZ-DPSK signal whose phase is controlled to 0 rad, thereby producing the result of interference as two outputs. Specifically, one of branch waveguides forming the Mach-Zehnder interferometer is formed so as to become longer than the other branch waveguide by a propagation length corresponding to a period of one bit, and the other branch has an electrode 121a used for subjecting an optical signal, which propagates through the other branch waveguide, to phase control.

The photoelectric conversion section 122 is formed from a dual pin photodiode which receives two optical outputs from the above delay interferometer 121, to thus perform differential photoelectric conversion detection (balanced detection). The received signal detected by the photoelectric conversion section 122 is converted from an electrical current signal into a voltage signal by means of a transimpedance amplifier 122c. The regeneration circuit (a 40 Gb/s CDR: Clock Data Recovery) 123 receives an input of a received signal detected by the photoelectric conversion section 122 by means of differential photoelectric conversion, byway of the transimpedance amplifier (TIA) 122c, and regenerates a data signal and extracts a clock signal. On the basis of the data signal and the clock signal, which have been regenerated and extracted by the regeneration circuit 123, the received data processing section 124 performs processing of an OTN framer or processing of a signal, such as error correction involving FEC decoding.

FIG. 9 is a block diagram showing an optical transponder system 100B which transmits or receives an optical signal by adoption of the 40 Gb/s RZ-DQPSK or CSRZ-DQPSK modulation scheme. This optical transponder system 100B comprises an optical transmitter 130 for transmitting an optical signal modulated by the RZ-DQPSK or CSRZ-DQPSK modulation scheme, and an optical receiver 140 for receiving the optical signal transmitted from the optical transmitter 130.

When the optical signal is transmitted or received by the RZ-DQPSK or CSRZ-DQPSK modulation-and-demodulation scheme, intensity of the optical signal is modulated by a 20 GHz clock waveform, and data are superposed on a quadrature optical phase. General descriptions of a configuration for transmitting or receiving data by means of the above-described RZ-DQPSK or CSRZ-DQPSK modulation-and-demodulation will be provided hereunder. However, details about the configuration are described in, e.g., JP-T-2004-516743.

The optical transmitter 130 shown in FIG. 9 comprises a transmission data processing section 131, a CW (Continuous Wave) light source 133, a π/2 phase shifter 134, two phase modulators 135-1, 135-2, and an RZ pulse generation intensity modulator 136.

As in the case of the transmission data processing section 111 shown in FIG. 8, the transmission data processing section 131 performs functions as the OTN framer and the FEC encoder. Further, the transmission data processing section 131 performs a function as a DQPSK precoder for encoding operation which is reflected to a difference between a one-bit-preceding code and a current code. This transmission data processing section 131 outputs two lines of 20 Gbit/s encoded data (data #1, data #2).

The CW light source 133 outputs continuous wave light, and the continuous wave light output from the CW light source 133 is branched. One of the branched light beams is input to the phase modulator 135-1, and the remaining light beam enters the phase modulator 135-2 by way of the π/2 phase shifter 134. The phase modulator 135-1 modulates the continuous wave light output from the CW light source 133 by utilization of the encoded data (data#1) of one channel separated by a 1:2 separation section 132, thereby outputting an optical signal in which data are superposed on a binary optical phase (0rad or πrad).

Moreover, the light, which is formed as a result of the continuous wave light from the CW light source 133 having under gone π/2 phase shifting effected by the π/2 phase shifter 134, is input to the phase modulator 135-2. This continuous wave light is modulated by the encoded data (data #2) of the other line separated by the 1:2 separation section 132, to thus output an optical signal in which data are superposed on a binary optical phase (π/2 rad or 3π/2 rad).

The modulated light beams output from the phase modulators 135-1, 135-2 are merged together and output to the RZ pulse generation intensity modulator 136 provided in a subsequent stage. Specifically, as a result of the modulated light beams output from the phase modulators 135-1, 135-2 being merged together, an optical signal in which data are superposed on a quadrature optical phase having constant light intensity; namely, the DQPSK modulated optical signal, can be output.

As in the case of the RZ pulse generation intensity modulator indicated by reference numeral 114 in FIG. 8, the RZ pulse generation intensity modulator 136 converts into an RZ pulse the optical signal into which the modulated light beams from the phase modulators 135-1, 135-2 are merged. Particularly, an optical signal, which has been converted into an RZ pulse through use of a clock drive signal whose frequency (20 GHz) is identical with a bit rate and whose amplitude is equal to the amplitude of the extinction voltage (Vπ), is referred to as an RZ-DQPSK signal. Further, an optical signal, which has been converted into an RZ pulse by use of a clock drive signal whose frequency (10 GHz) is half the bit rate and whose amplitude is double that of the extinction voltage (Vπ), is referred to as a CSRZ-DQPSK signal.

Moreover, the optical receiver 140 is connected to the optical transmitter 130 by way of the transmission path 101, and subjects the (CS) RZ-DQPSK signal from the optical transmitter 130 to received signal processing. In addition to including an optical signal branch section 146 for branching the received optical signal, the optical receiver 140 has delay interferometers 141-1, 141-2, photoelectric conversion sections 142-1, 142-2, regeneration circuits (20 Gb/s CDR) 143-1, 143-2, and a received data processing section 145.

Two signals into which the (CS)RZ-DQPSK signal transmitted through the transmission path 101 is branched are input to the delay interferometers 141-1, 141-2, respectively. The delay interferometer 141-1 subjects a (CS)RZ-DQPSK signal delayed for a period of one bit and a (CS)RZ-DQPSK signal having undergone π/4 rad phase control to interference (delayed interference), and a result of interference is generated as two outputs. Alternatively, the delay interferometer 141-2 subjects a (CS)RZ-DQPSK signal delayed for a period of one bit and a (CS)RZ-DQPSK signal having undergone −π/4 rad phase control (shifted from that of the delay interferometer 141-1 by π/2) to interference (delayed interference), and a result of interference is generated as two outputs.

Each of the delay interferometers 141-1, 141-2 is also formed from a Mach-Zehnder interferometer. One of branch waveguides, which constitute each Mach-Zehnder interferometer, is formed so as to become longer than the other branch waveguide by a propagation length corresponding to a period of one bit. The delay interferometers 141-1, 141-2 have respective electrodes 141a, 141b for controlling the phase of an optical signal which propagates through the other branch waveguide.

The photoelectric conversion section 142-1 is formed from a dual-pin photodiode which performs differential photoelectric conversion detection by means of receiving two output light beams from the delay interferometer 141-1. Likewise, the photoelectric conversion section 142-2 is formed from a dual-pin photodiode which performs differential photoelectric conversion detection by means of receiving two light beams output from the delay interferometer 141-2. The received signal, which has been detected by the photoelectric conversion sections 142-1, 142-2, is converted from an electric current signal into a voltage signal by means of a transimpedance amplifier 142e.

The regeneration circuit 143-1 regenerates, from an electrical signal corresponding to the intensity of an optical signal received by the photoelectric conversion section 142-1, an I (In-phase) signal of the clock and the data. The regeneration circuit 143-2 regenerates a Q (Quadrature-phase) signal of the clock and the data, from the optical signal received by the photoelectric conversion section 142-2.

The received data processing section 145 performs a function as an OTN framer and a function of effecting error correction by means of FEC decoding operation, on the basis of the clock signal and the data signal regenerated by the regeneration circuits 143-1, 143-2.

As mentioned above, according to the (CS)RZ-D(Q)PSK modulation-and-demodulation scheme, in order to convert a phase modulation signal into an intensity modulation signal and identify the signal by the optical receivers 120, 140, the delay interferometers 121, 141-1, and 141-2 impart a delay difference corresponding to a duration of one bit to thus cause optical interference.

Incidentally, each of the regeneration circuit 123 of the optical receiver 120 shown in FIG. 8 and the regeneration circuits 143-1, 143-2 of the optical receiver 140 shown in FIG. 9 can be configured from a clock recovery circuit (CR) 151 and a D flip-flop 152, as shown in FIG. 10. The clock recovery circuit 151 extracts a clock signal from an electrical signal which has been received by the photoelectric conversion section and has intensity variations corresponding to the code of the data. The D flip-flop 152 takes as a data input the electrical signal received by the photoelectric conversion section; takes as a clock input a clock signal recovered by the clock recovery circuit 151; and outputs regenerated data.

The clock recovery circuit 151 is constituted of a PLL (Phase-locked Loop) circuit formed from, e.g., a phase comparator 151a, a loop filter 151b, and a voltage controlled oscillator (VCO) 151c.

Particularly, the phase comparator 151a outputs a signal corresponding to a phase difference or frequency difference between the clock signal output from the VCO 151c and the electrical signal output from the photoelectric conversion section. FIGS. 2 and 3 of a related art document; i.e., J. D. H. Alexander "Clock Recovery from Random Binary Data," Electronics Letters, vol. 11, pp. 541-542, October 1975, show the phase comparator 151a constituting the clock recovery circuit 151.

For instance, as shown in FIG. 11, an equalizing filter 153 and a limiting amplifier (LIA) 154 are interposed between the transimpedance amplifier 142e and the regeneration circuit 143-1 (143-2) of the optical receiver 140 shown in FIG. 9. The equalizing filter 153 subjects an output from the transimpedance amplifier 142e to waveform shaping, and the limiting amplifier 154 normalizes the amplitude of an output from the equalizing filter 153. The optical receiver 120 shown in FIG. 8 can also be equipped with the equalizing filter 153 and the limiting amplifier 154, which are analogous to those mentioned previously. As a result of interposition of the equalizing filter 153 such as that shown in FIG. 11, the waveform of a received signal is known to be shaped to thereby broaden an eye opening, thereby enhancing receiving sensitivity.

Techniques described in the following patent documents are available as known techniques relevant to the present invention.

(Patent Document 1) JP-A-2005-260696
(Patent Document 2) JP-A-2003-87201
(Patent Document 3) JP-A-2005-252369

However, since the waveform of the received signal, which is detected by photoelectric conversion, assumes the waveform shape of the RZ signal, the optical receivers 120, 140 shown in FIGS. 8 and 9 are hindered from making the accuracy of a clock signal extracted by the clock recovery circuit 151 highly precise. Even when the equalizing filter 153 shown in FIG. 11 is interposed, as shown in FIG. 3B, the waveform of the received signal assumes a waveform such as that of the RZ signal; and hence the same problem can be said to arise.

More specifically, the waveform of an electrical signal output from the transimpedance amplifier 122c forming the optical receiver 120 or from the transimpedance amplifier 142e forming the optical receiver 140 does not exhibit a constant amplitude when changes in the code remain constant from 0 to 0 or from 1 to 1, but assumes the shape of a waveform such as that of the RZ signal. Therefore, when a change has arisen in a code, difficulty is encountered in detecting the edge, which in turn poses difficulty in enhancing the accuracy of a clock signal to be detected. In this case, even when the eye opening has been broadened by the equalizing filter 153, the accuracy of the clock signals recovered by the recovery circuit 123, 143-1, and 143-2 cannot be enhanced to a great extent.

The reason for this can be said to be that the clock recovery circuit 151, such as that conventionally adopted and shown in FIG. 10, is usually provided with the phase comparator 115a, such as that described in the previously-described documents, and is designed on the premise that the format of a signal input for extracting a clock signal is an NRZ signal. In short, with a view toward enhancing the accuracy of a detected clock signal, the conventional clock recovery circuit 151 is required to prevent occurrence of changes in amplitude, which would otherwise be caused when changes in the code remain constant from 0 to 0 or from 1 to 1.

The electrical signals output from the transimpedance amplifiers 122c, 142e can also be conceived to assume a signal waveform whose property is to assume a constant waveform when changes in the code remain constant from 0 to 0 or from 1 to 1. In order to maintain superior receiving sensitivity, a wide eye opening, such as that shown in FIG. 3B, must be sustained.

The related-art technology, including the techniques described in Patent Documents 1 to 3, fails to provide any technique for enhancing the accuracy of a clock signal to be extracted while maintaining such superior receiving sensitivity.

SUMMARY OF THE INVENTION

The present invention has been conceived in view of such problems, and is intended for enhancing the accuracy of a clock signal to be extracted while maintaining superior receiving sensitivity.

To this end, a signal regeneration device of the present invention is characterized by including a branch section for branching an input electrical signal which has been demodulated from a differential phase-shift modulated state; a first filter for equalizing a waveform of one of the demodulated electrical signals branched by the branch section; a clock recovering section for recovering a clock signal from the demodulated electrical signal whose waveform has been equalized by the first filter; and a data regeneration section for regenerating a data signal from a remaining one of the demodulated electrical signals branched by the branch section and from a clock signal recovered by the clock recovery section.

In this case, the signal regeneration device may further include a second filter for subjecting to waveform shaping the remaining one of the demodulated electrical signals branched by the branch section, and the second filter may supply the demodulated electrical signal, which has undergone waveform shaping, to the data regeneration section.

Alternatively, the signal regeneration device may further include a second filter for subjecting a demodulated electrical signal, which is in a stage before being input to the branch section, to waveform shaping, and the second filter may supply the demodulated electrical signal, which has undergone waveform shaping, as an input to the branch section.

More preferably, the second filter can be embodied as a filter having a characteristic of making an eye opening of the demodulated electrical signal, which is to be input to the data regeneration section, greater than an eye opening of a demodulated electrical signal to be output from the first filter.

Further, the first filter can preferably be embodied as a low-pass filter having a characteristic of being able to extract a sequence of identical signs from the demodulated electrical signal.

The first filter can also be embodied as a low-pass filter having a characteristic of having a −3 dB frequency which is lower than that of the second filter. In this case, the second filter can also be embodied as a low-pass filter having a characteristic of having a −3 dB frequency which is higher than that of the first filter but lower than a frequency equivalent to a bit rate of the regenerated data signal.

An optical receiver of the present invention is also characterized by including a delay interference section for processing an optical signal having been subjected to (Differential Phase Shift Keying) differential phase-shift modulation; a photoelectric conversion detection section which subjects the optical signal processed by the delay interference section to photoelectric conversion detection, thereby outputting an electrical signal demodulated from the differential phase-shift modulated state; a branch section for branching the demodulated electrical signal output from the photoelectric conversion detection section; a first filter for equalizing the waveform of one of the demodulated electrical signals branched by the branch section; a clock recovery section for recovering a clock signal from the demodulated electrical signal whose waveform has been equalized by the first filter; and a data regeneration section for regenerating a data signal from a remaining one of the demodulated electrical signals branched by the branch section and from the clock signal recovered by the clock recovery section.

In addition, a signal regeneration method of the present invention is characterized by including branching an electrical signal demodulated from a differential phase shift keying modulated state; subjecting a waveform of one of the branched demodulated electrical signals to filtering, to thus equalize the waveform; recovering a clock signal from the demodulated electrical signal whose waveform has been equalized; and regenerating a data signal from a remaining one of the branched demodulated electrical signals and from the recovered clock signal.

As mentioned above, according to the present invention, the branch section branches the electrical signal used for recovering a clock signal along with an electrical signal for regenerating data. Moreover, the waveform of one of the demodulated electrical signals branched by the branch section is equalized by means of an equalizing filter, and the clock recovery section can recover a clock signal from the demodulated electrical signal whose waveform has been equalized. Accordingly, there is yielded an advantage of the ability to enhance the accuracy of an extracted clock signal while maintaining superior receiving sensitivity.

BRIEF DESCRIPTION OF THE DRAWINGS

FIG. 1 is a block diagram showing a signal regeneration device according to an embodiment of the present invention;

FIGS. 2A and 2B are views for describing operation for causing an equalizing filter to equalize a demodulated electrical signal;

FIGS. 4A to 4D each are views for describing setting of a filter characteristic of the equalizing filter;

FIGS. 5A to 5D are each views for describing setting of a filter characteristic of the equalizing filter;

FIG. 7 is a view for comparison between general characteristics of a duo-binary modulation scheme and those of a CS-RZ modulation scheme, along with general characteristics of an NRZ modulation scheme, those of an RZ-DPSK modulation scheme, and those of an RZ-DQPSK modulation scheme;

DESCRIPTION OF THE PREFERRED EMBODIMENTS

An embodiment of the present invention will be described hereinbelow by reference to the drawings.

In addition to the above-described object of the present invention, another technical drawback, means for solving the technical drawback, and a working effect thereof will become evident by the following disclosure of the present embodiment.

[A] Description of One Preferred Embodiment

Figure 11:
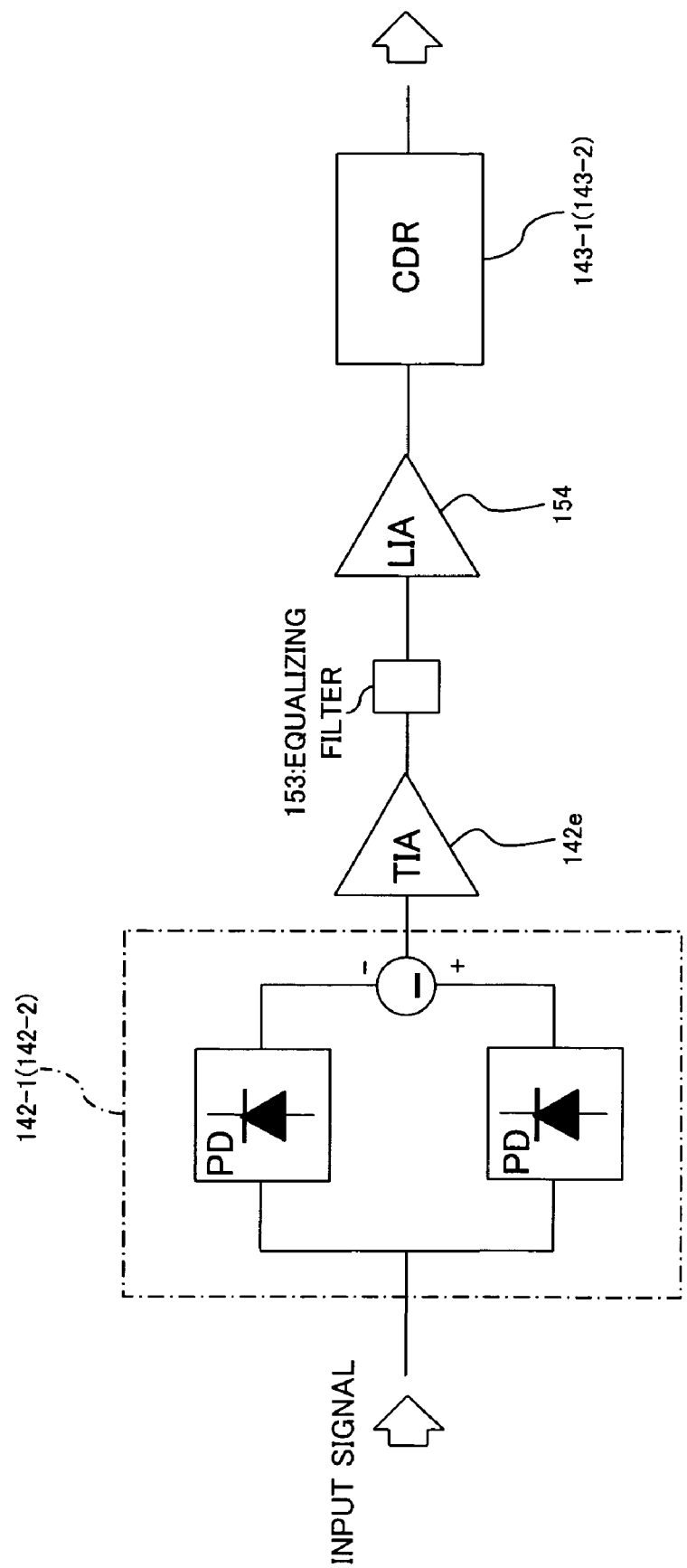
FIG. 11 is a view showing the principal section of an optical receiver equipped with an equalizing filter.

FIG. 1 is a block diagram showing a signal regeneration device 10. The signal regeneration device 10 shown in FIG. 1 is applied to the optical receiver of the optical transponder system adopting the (CS)RZ-DQPSK modulation-and-demodulation scheme shown in FIG. 9, and regenerates a data signal and a clock signal from the waveform of a received electrical signal which has been detected by means of photoelectric conversion. Put another way, two of the signal regeneration devices 10 are provided in place of the regeneration circuits 143-1, 143-2 (see FIG. 11) in the configuration of the optical receiver 140 shown in FIG. 9, respectively.

Figure 9:
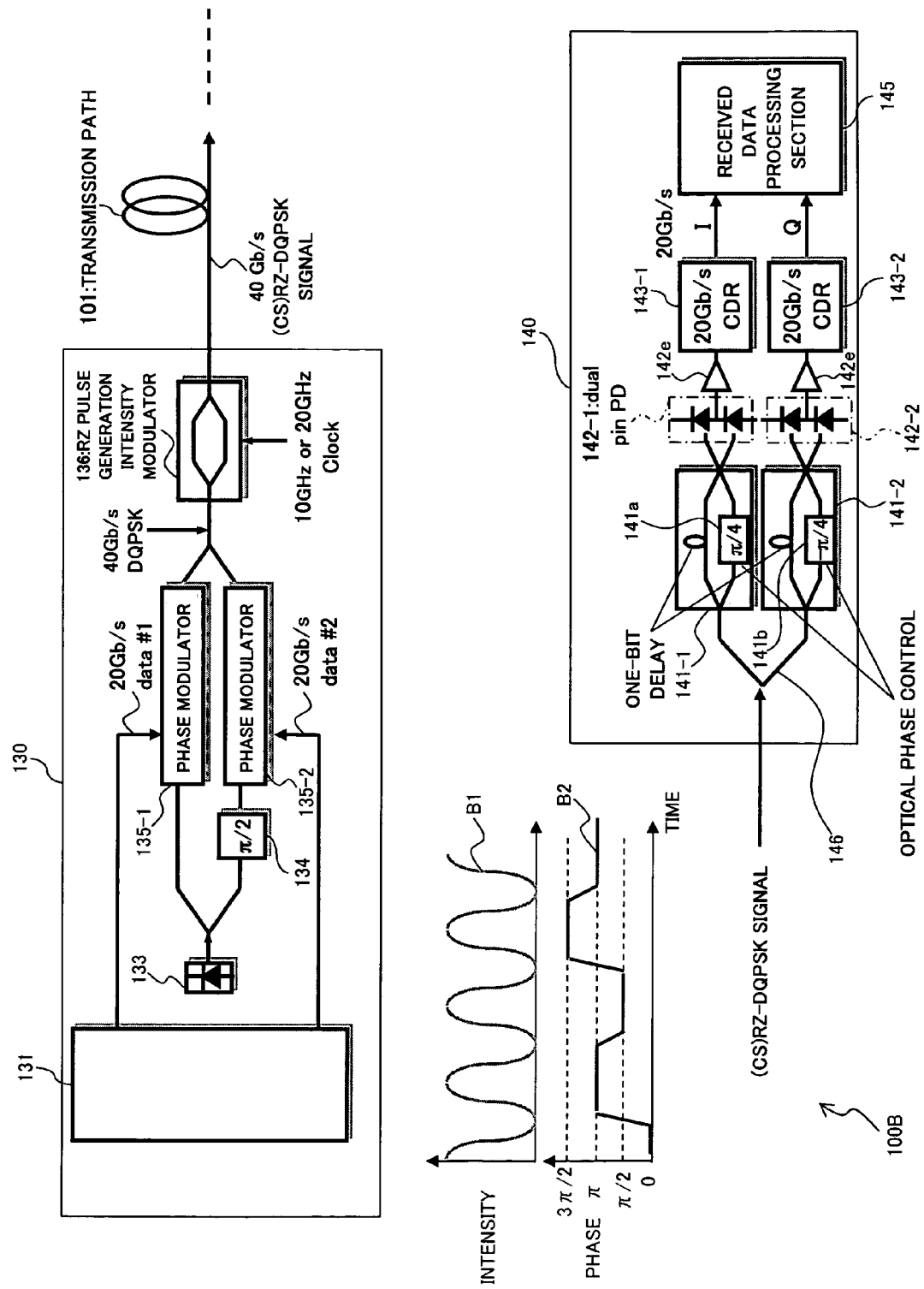
FIG. 9 is a block diagram showing an example configuration of an optical transponder system for transmitting and receiving an optical signal by adoption of a 40 Gb/s RZ-DQPSK or CSRZ-DQPSK modulation scheme.

Specifically, the signal regeneration device 10 receives an electrical signal (a voltage signal) from the transimpedance amplifier 142e in the optical receiver 140 shown in FIG. 9; regenerates a data signal and a clock signal from the waveform of the electrical signal; and can supply the thus-regenerated data signal to the received data processing section 145. Even the optical receiver, to which the signal regeneration device 10 shown in FIG. 1 is applied, is equipped with an optical signal branch section, a delay interferometer, and a received data processing section (see reference numerals 146, 141-1, 141-2, and 145), as in the case shown in FIG. 9. The configurations of these elements are omitted from FIG. 1.

In FIG. 1, reference numeral 142 designates a photoelectric conversion section formed from a dual-pin photodiode, and corresponds to one of the two photoelectric conversion sections 142-1, 142-2 shown in FIG. 9. Specifically, the photoelectric conversion section 142 subjects the optical signal, which has been processed by an unillustrated delay interferometer, to photoelectric conversion detection, thereby outputting an electrical signal which has been demodulated from a differential Quadrature phase shift keying (DQPSK) modulated state. In this demodulated electrical signal, the intensity of the data signal is modulated.

The signal regeneration device 10 has the branch section 1; two equalizing filters 2, 3; the clock recovery circuit 4; the data regeneration section 5; and the limiting amplifiers 6, 7.

The branch section 1 branches the received electrical signal output from the transimpedance amplifier 142e; which the electrical signal has been demodulated from a differential quadrature phase shift keying (DQPSK) modulated state. One of the branched demodulated electrical signals is output to the equalizing filter 2, and the other one is output to the remaining equalizing filter 3.

The equalizing filter 2 is a first filter for equalizing the wave form of one of the demodulated electrical signals branched by the branch section 1. Put another way, the equalizing operation performed by the equalizing filter 2 is operation for preventing occurrence of changes in the amplitude of the demodulated electrical signal output from the branch section 1, which would otherwise arise when the same code appears consecutively. As indicated by reference symbol A shown in FIG. 1, the equalizing operation is operation for imparting amplitude changes to a code as in an NRZ signal. The equalizing operation may be operation for simply rendering a waveform round by use of a low-pass filter or operation for converting a waveform into a desired wave form by means of inserting filters—hose frequency characteristics in the vicinity of a cut-off frequency range have been pushed up—in a cascade manner in order to compensate for the frequency characteristic of an input signal.

Here, the demodulated electrical signal output from the transimpedance amplifier 142e is an electrical signal which is formed by modulating the intensity of the data signal. When the demodulated electrical signal output from the transimpedance amplifier 142e is a data signal which has a bit rate of about 20 GHz and whose intensity has been modulated, the above-described equalizing filter 2 can be configured as a low-pass filter having a −3 dB frequency of about 9 GHz so that it can cut high frequency components in the demodulated electrical signal.

FIGS. 2A and 2B are views for describing operation for equalizing the demodulated electrical signal by use of the equalizing filter 2. As indicated by points in time t1 to t9 shown in FIG. 2A, when the code of the demodulated electrical signal, which is input to the equalizing filter 2 and whose intensity has been modulated, sequentially assumes "1," "0," "1," "0," "0," "1," "1," "1," the demodulated electrical signal (DQPSK received signal) has sharp amplitude changes as indicated by W1 shown in FIG. 2B.

Specifically, when the code assumes "1," the demodulated electrical signal takes a positive amplitude value. When the code assumes "0," the demodulated electrical signal takes a negative amplitude value. When the codes "0," "0" continue (see points in time t4 to t6) or when the codes "1," "1" continue (see points in time t6 to t9), the demodulated electrical signal W1 behaves such that the amplitude value temporarily returns to 0 at the time of code changing (at an edge) (see points in time t5, t7, and t8). Put another word, the frequency components of the demodulated electrical signal W1 contain high-frequency signal in correspondence to the area where an abrupt change arises in amplitude.

When such an electrical signal W1 is input to the equalizing filter 2, the equalizing filter 2 can output an electrical signal having a waveform such as that indicated by W2 shown in FIG. 2B. Specifically, the equalizing filter 2 cuts high-frequency components contained in the electrical signal W1, to thus equalize the waveform of the signal. As a result, in a waveform W2 of an output electrical signal, an amplitude value does not return to 0 when the same code changes, and variations in amplitude are suppressed (see points in time t5, t7, and t8).

As a result, when the waveform of the electrical signal having passed through the equalizing filter 2 is viewed in terms of an eye pattern, the waveform is equalized as illustrated by A shown in FIG. 1. A difference can be set in changes of amplitude between the case where different codes appear consecutively and the case where the same code appears consecutively. The difference between the changes in amplitude value can be viewed in the form of a triangular opening in A1 of the eye pattern.

A limiting amplifier 6 receives an electrical signal from the equalizing filter 2; which electrical signal is a demodulated electrical signal whose waveform has been equalized by the equalizing filter 2; normalizes an amplitude value of the electrical signal whose waveform has been equalized; and supplies the electrical signal with a normalized amplitude to the clock recovery circuit 4. Moreover, on the basis of the electrical signal output from the limiting amplifier 6, the clock recovery circuit (clock recovery section) 4 extracts a clock signal contained in the demodulated electrical signal output from the transimpedance amplifier 142e, and has the same configuration as that shown in FIG. 11 (see reference numeral 151).

The clock recovery circuit 4 is a clock recovery section which receives an input of a signal, whose waveform has been equalized by the equalizing filter 2, by way of the limiting amplifier 6 and which recovers a clock signal from the input signal. As in the case shown in FIG. 11, this clock recovery circuit 4 is also formed from a PLL circuit including a phase comparator (see reference numeral 151a) designed on the premise of use of an NRZ signal.

Figure 10:
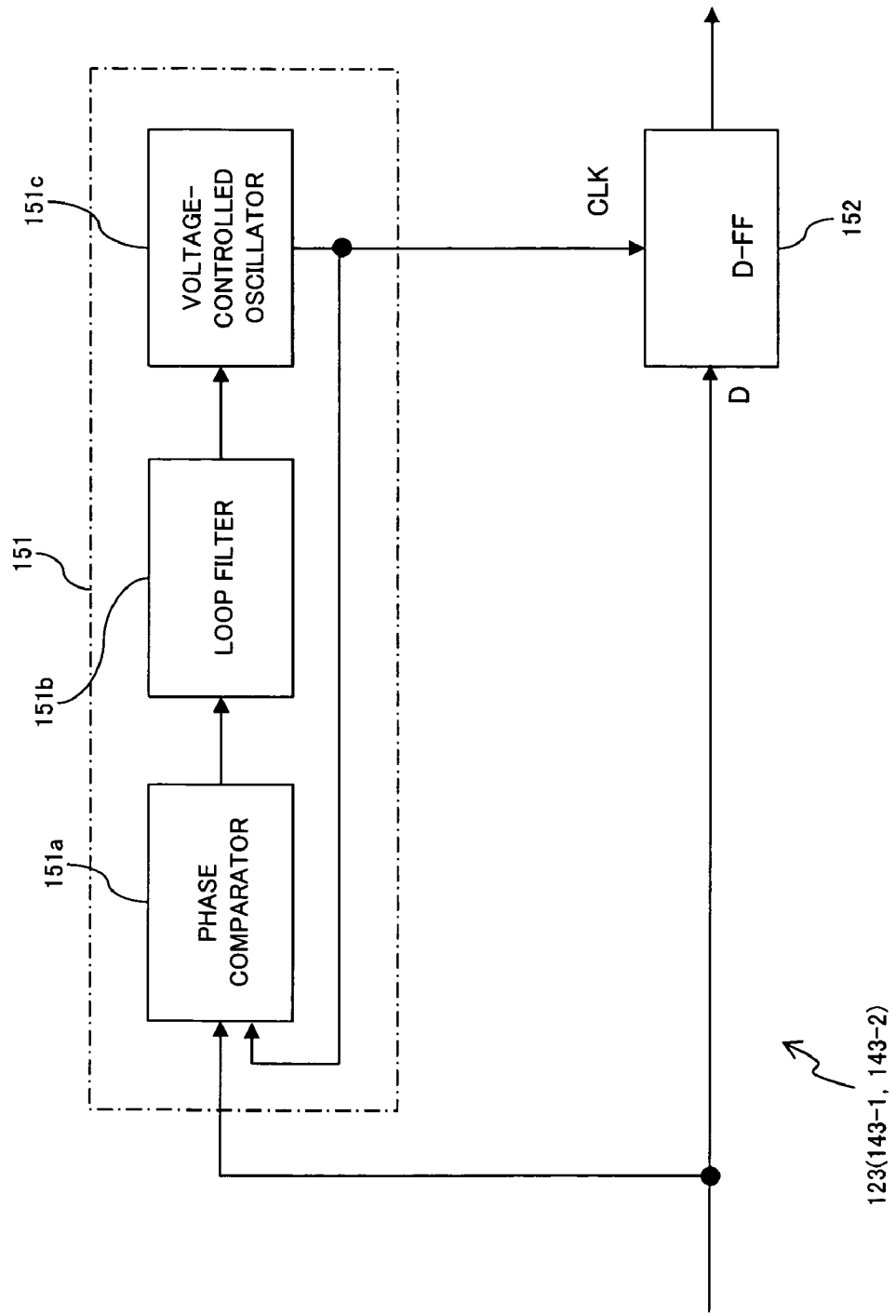
FIG. 10 is a block diagram showing clock recovery circuit.

At this time, the demodulated electrical signal having such a signal waveform (see A in FIG. 1) as to assume a constant waveform when the code assumes "0" "0" consecutively or assumes "1" "1" consecutively is input to the clock recovery circuit 4 by means of filtering operation performed by the equalizing filter 2. As a result, the clock recovery circuit 4 can extract a clock signal which is more accurate than that extracted in the case shown in FIG. 10. The clock signal that has been extracted with high accuracy by the clock recovery circuit 4 is supplied to the data regeneration section 5 in a subsequent stage.

The equalizing filter 3 is a second filter which subjects the remaining one of the demodulated electrical signals branched by the branch section 1 to waveform shaping. In order to maintain a superior receiving sensitivity characteristic, the equalizing filter 3 has such a filtering characteristic as to be able to output a demodulated electrical signal having a wide eye opening, as shown in FIG. 1B. For instance, the equalizing filter 3 can be formed from a low-pass filter which converts a frequency corresponding to about 80% of the bit rate into a −3 dB frequency.

Specifically, when the demodulated electrical signal corresponds to the data signal which has a bit rate of about 20 Gb/s and whose intensity is modulated, the equalizing filter 3 can be constituted of a low-pass filter for converting a frequency of about 16 GHz into a−3 dB frequency. An electrical signal, which is to pass through such an equalizing filter 3, can be made to have an eye opening (see B1 in FIG. 1) which is wider than that of the waveform (see A in FIG. 1) of the electrical signal having passed through the equalizing filter 2.

Put another way, the equalizing filter 3 is a low-pass filter having a characteristic of making the eye opening of the demodulated electrical signal input to a D flip-flop 5 on a subsequent stage wider than the eye opening of the demodulated electrical signal output from the equalizing filter 2.

Figure 3A:
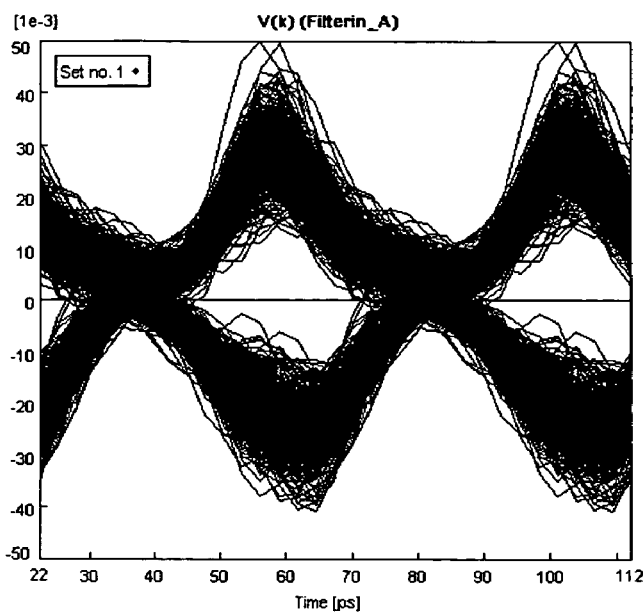
FIGS. 3A and 3B are views for describing shaping of distortions of a waveform due to wavelength dispersion, through waveform shaping operation performed by the equalizing filter.
Figure 3B:
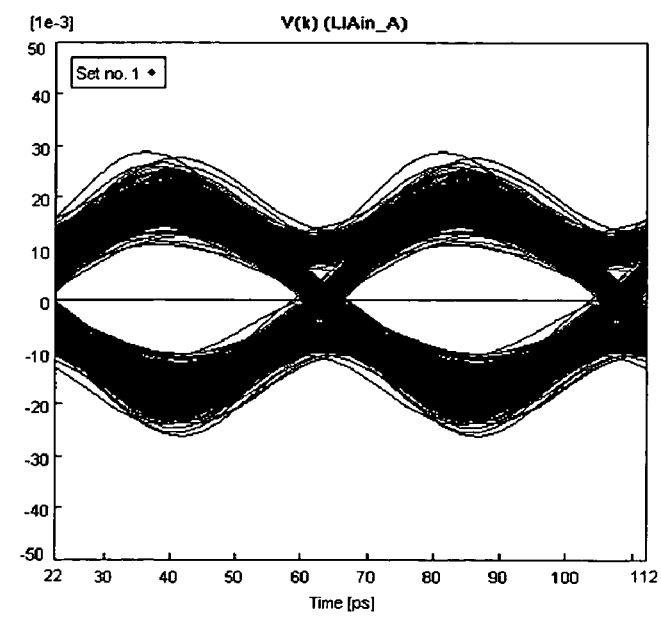

Distortions in the waveform induced by wavelength dispersion can also be shaped through the waveform shaping operation performed by the equalizing filter 3. FIG. 3A is a view showing an example of received waveform acquired when wavelength dispersion of +80 ps/nm/km is present in a transmission path. Even in the electrical signal where such wavelength dispersions present, distortions in the waveform can be shaped, as shown in, e.g., FIG. 3B, by means of causing the electrical signal to pass through the equalizing filter 3 having a frequency band of, e.g., 16 GHz.

A limiting amplifier 7 receives an input of an electrical signal from the equalizing filter 3; namely, an input of a demodulated electrical signal whose waveform has been equalized by the equalizing filter 3; normalizes an amplitude value of the demodulated electrical signal whose waveform has undergone waveform shaping; and supplies the electrical signal to the data regeneration section 5 on a subsequent stage.

The data regeneration section 5 regenerates a data signal from the remaining one of the electrical signals branched by the branch section 1 and the clock signal recovered by the clock recovery circuit 4, and can be formed from a D flip-flop (DFF). Specifically, the data regeneration section 5 receives an input of data by way of the equalizing filter 3 and the limiting amplifier 7 in connection with the remaining one of the demodulated electrical signals branched by the branch section 1, as well as receiving an input of a clock signal recovered with high accuracy by the clock recovery circuit 4. The data regeneration circuit 5 can regenerate and output a data signal synchronized with the input clock signal.

The data signal and the clock signal, which have been regenerated by the data regeneration section 5, are input to an unillustrated received data processing section (see reference numeral 145 shown in FIG. 9) constituting the optical receiver. On the basis of the thus-regenerated data signal and clock signal, received signal processing such as OTN framer processing or error correction processing is performed.

FIGS. 4A to 4D and FIGS. 5A to 5D are views for describing setting of the filtering characteristics of the equalizing filters 2, 3. The equalizing filters 2, 3 can be preferably formed from a quintic Bessel-Thomson-type low-pass filter. As mentioned above, the equalizing filters 2, 3 are formed from low-pass filters which differ from each other by a frequency of −3 dB because of the above-described difference in required characteristics of waveforms of the electrical signals to be output.

FIG. 5A is a view showing an eye pattern of an electrical signal having passed when a demodulated electrical signal having an eye pattern, such as that shown in FIG. 4A, is input to the low-pass filter having a −3 dB frequency of 9 GHz. FIG. 5B is a view showing an eye pattern of an electrical signal having passed when a demodulated electrical signal having an eye pattern, such as that shown in FIG. 4B, is input to the low-pass filter having a −3 dB frequency of 12 GHz. FIG. 5C is a view showing an eye pattern of an electrical signal having passed when a demodulated electrical signal having an eye pattern, such as that shown in FIG. 4C, is input to the low-pass filter having a −3 dB frequency of 14 GHz. FIG. 5D is a view showing an eye pattern of an electrical signal having passed when a demodulated electrical signal having an eye pattern, such as that shown in FIG. 4D, is input to the low-pass filter having a −3 dB frequency of 16 GHz. FIGS. 4A to 4D show the demodulated electrical signals which are output from the transimpedance amplifier 142; which have a bit rate of about 20 Gb/s; and which have identical waveform characteristics.

As shown in FIGS. 4A to 4D and FIGS. 5A to 5D, input electrical signals are understood to have essentially identical waveforms. However, variations are understood to exist in the eye openings, because of filtering characteristics. Alternatively, variations are understood to arise in the change of an amplitude value when the same code appears consecutively.

Specifically, as the −3 dB frequency is reduced from 16 GHz to a smaller value, the eye opening becomes smaller. Accordingly, the waveform becomes unfavorable for a Q value, and achieving a superior receiving sensitivity characteristic becomes difficult (see E1 to E4 in FIGS. 5A to 5D). Put another way, as the −3 dB frequency is increased from 9 GHz, the eye opening becomes wider, and hence a superior receiving sensitivity characteristic becomes easy to acquire. But in the case of a low-pass filter for converting 20 GHz, which corresponds to the bit rate, into a −3 dB frequency, the receiving sensitivity characteristic is decreased as compared with the case of 16 GHz.

Consequently, when a demodulated electrical signal having a bit rate of 20 Gb/s is caused to pass, the −3 dB frequency of the equalizing filter 3—which is to output an electrical signal used for enhancing the receiving sensitivity characteristic—can be set to a −3 dB frequency which is lower than a frequency (20 GHz in this case) corresponding to the bit rate of the data signal whose intensity has been modulated by the demodulated electrical signal, but which is higher than at least 9 GHz; particularly preferably a frequency of about 16 GHz.

As the −3 dB frequency is made larger from 9 GHz to a greater value, variations in amplitude value acquired when the same code appears consecutively become greater. For this reason, the waveform output from the filter is a waveform which is unfavorable as a demodulated electrical signal used for clock recovery operation performed by the clock recovery circuit 4, and extracting a highly precise clock signal becomes difficult (see C1 to C4 in FIGS. 5A to 5D). As the −3 dB frequency is made smaller from 16 GHz, variations in amplitude value achieved when the same code appears consecutively become smaller. Accordingly, when the waveform of the output from the filter is used as a demodulated electrical signal used for clock recovery operation performed by the clock recovery circuit 4, a highly precise clock signal can be recovered.

Consequently, when a demodulated electrical signal having a bit rate of 20 Gb/s is caused to pass, the −3 dB frequency of the equalizing filter 2—which is to output an electrical signal used for regenerating a highly precise clock signal—can be set to a frequency which is lower than the −3 dB frequency set in the equalizing filter 3, particularly preferably a frequency of about 9 GHz.

As mentioned above, the equalizing filter 2 must make the waveform of the demodulated electrical signal suitable for extracting a clock signal. Meanwhile, the equalizing filter 3 must render the waveform of the demodulated electrical signal suitable for enhancing receiving sensitivity. At least the −3 dB frequency of the equalizing filter 2 must be made lower than the −3 dB frequency of the equalizing filter 3.

Each of the equalizing filters 2 and 3 is formed from a low-pass filter. However, the filtering characteristics of the equalizing filters 2, 3 are not limited to a low-pass filter, so long as equalizing filter 2 obtains the waveform of a signal used for extracting a highly precise clock signal and the equalizing filter 3 obtains the waveform of the data signal used for regenerating a data signal having superior receiving sensitivity.

The following is operation performed when the signal regeneration device 10 of the present embodiment having the above-described configuration is applied in lieu of the respective regeneration circuits 143-1, 143-2 of the optical receiver 140 shown in FIG. 9.

When the optical signal that has been modulated by the optical transmitter 130, such as that shown in FIG. 9, in accordance with the DQPSK modulation scheme is input by way of the transmission path 101, the optical signal is branched by the optical signal branch section 146. The branched optical signals are subjected to processing performed by the delay interferometers 141-1, 141-2. Moreover, the photoelectric conversion sections 142-1, 142-2 receive optical outputs from the respective delay interferometers 141-1, 141-2, to thus perform differential photoelectric conversion detection. Thus, an electrical signal corresponding to the intensity of an optical signal is output as a demodulated optical signal.

The transimpedance amplifier 142e converts the demodulated electrical current signal into a voltage signal, and outputs the voltage signal to the signal regeneration device 10, which is employed in place of the respective regeneration circuits 143-1, 143-2. The signal regeneration device 10, which inputs the electrical signal corresponding to the intensity of an optical signal received by the photoelectric conversion section 142-1, regenerates an I (In-phase) signal of the clock signal and the data signal. The signal regeneration device 10 having received an input of the optical signal received by the photoelectric conversion section 142-2 regenerates a Q (Quadrature-phase) signal of the clock signal and the data signal. By use of the thus-regenerated clock signal and data signal, a received data processing section (see reference numeral 145 in FIG. 9) on a subsequent stage performs processing such as framer processing or error correction processing.

At this time, the signal regeneration device 10 regenerates a clock signal on the basis of the electrical signal having passed through the equalizing filter 2. Hence, the accuracy of the clock signal can be enhanced, and data can be regenerated from the electrical signal having passed through the equalizing filter 3 in synchronism with the clock signal whose accuracy has been enhanced. Accordingly, receiving sensitivity can be enhanced, and enhanced signal quality can be attained.

Attention is paid to processing performed by one of the two signal regeneration devices 10, the electrical signal demodulated from a differential phase shift keying modulated state; namely, the electrical signal output from the transimpedance amplifier 142e is branched by the branch section 1, as shown in FIG. 1. The equalizing filter 2 equalizes the waveform of one of the two branched demodulated electrical signals through filtering, to thus convert the demodulated electrical signal into an electrical signal having a waveform compatible with clock recovery operation performed by the clock recovery circuit 4 on a subsequent stage.

The clock recovery circuit 4 recovers a highly precise clock signal from the demodulated electrical signal whose waveform has been equalized. Moreover, the D flip-flop serving as the data regeneration section 5 receives, as a data input, the remaining one of the demodulated electrical signals branched by the signal branch section 1. The clock signal recovered by the clock recovery circuit 4 is input, to thereby regenerate a data signal.

At that time, the demodulated electrical signal input, as a data input, to the D flip-flop serving as the data regeneration section 5 is subjected to waveform shaping by means of the equalizing filter 3 in such a manner that an eye opening becomes wider. Hence, the receiving quality of the regenerated data signal can be enhanced.

As mentioned above, according to the present invention, the signal branch section 1 branches a received electrical signal into an electrical signal used for recovering a clock signal and an electrical signal used for regenerating data. The equalizing filter 2 equalizes the waveform of one of the demodulated electrical signals branched by the signal branch section 1, and the clock recovery section 4 can recover a clock signal from the demodulated electrical signal whose waveform has been equalized. Hence, there is yielded an advantage of the ability to enhance the accuracy of an extracted clock signal while rendering receiving sensitivity superior.

In the related art, the electrical signal having passed through a common equalizing filter 153 is used for regenerating a data signal and a clock signal. Therefore, the characteristic of the equalizing filter 153 cannot be set so as to become optimal for regenerating both a data signal and a clock signal. However, according to the present invention, regeneration processing suitable for the quality of a data signal and extraction of a clock signal can be performed.

[B] Others

Despite the above embodiment, the present invention can be practiced while being variously modified without departing the gist of the present invention.

Figure 6A:
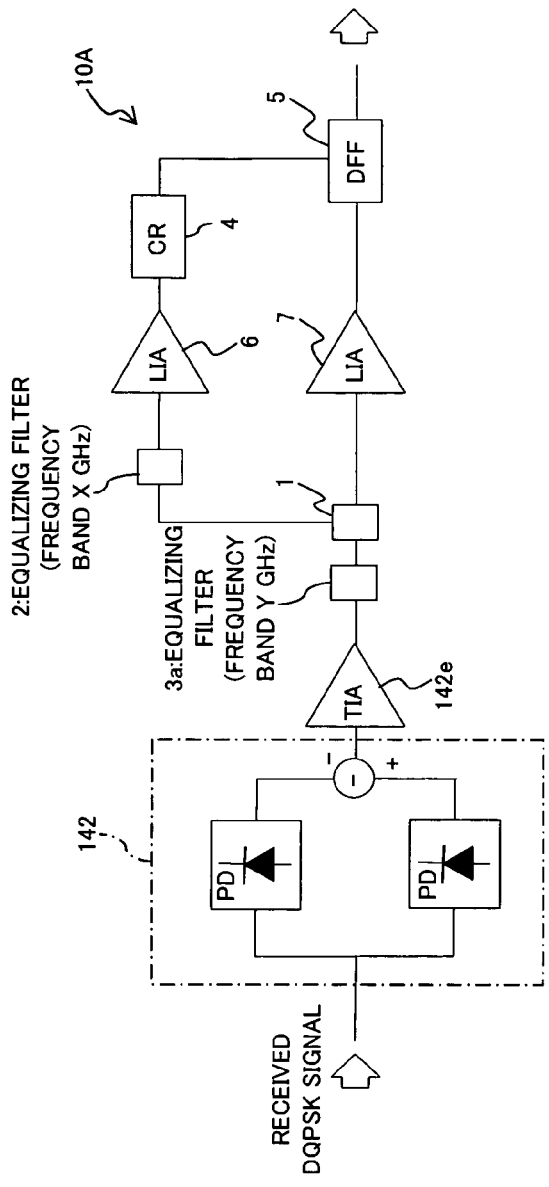
FIGS. 6A and 6B are views showing a signal regeneration device according to a modification of the present embodiment.
Figure 6B:
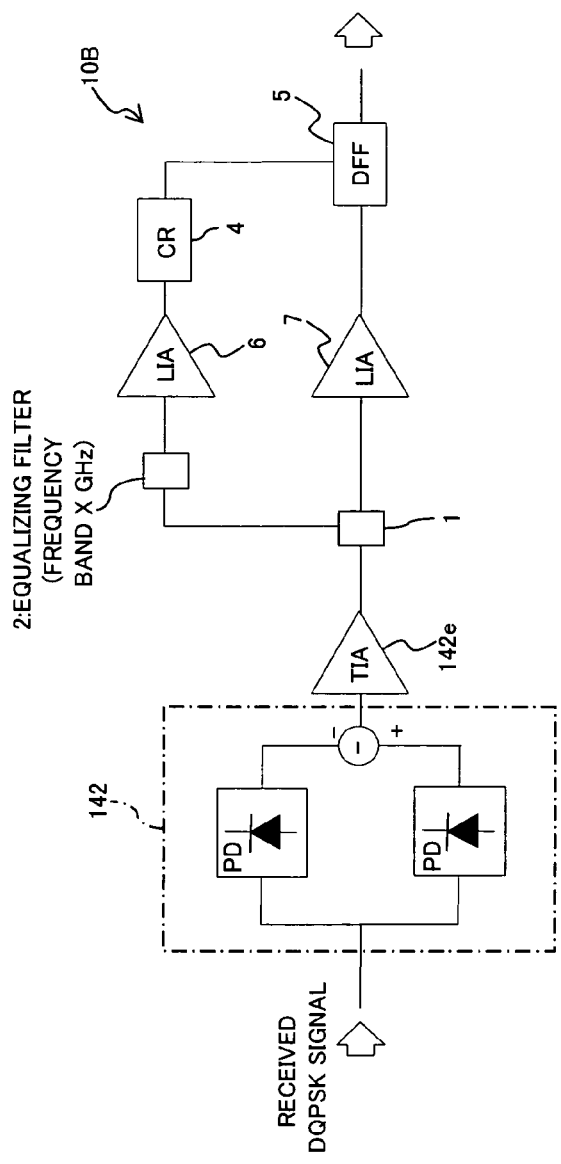

FIG. 6A is a view showing a signal regeneration device 10A according to a modification of the present embodiment, and FIG. 6B is a view showing a signal regeneration device 10B according to another modification of the present embodiment. The signal regeneration device 10A shown in FIG. 6A differs from the signal regeneration device 10 shown in FIG. 1 in that an equalizing filter 3a is provided on a stage preceding the signal branch section 1 [i.e., subsequent to the transimpedance amplifier (TIA) 142e]. In other respects, the signal regeneration devices 10 and 10A are basically analogous to each other. In FIG. 6A, the same reference numerals designate essentially the same elements as shown in FIG. 1.

The equalizing filer 3a shown in FIG. 6A is a second filter which subjects to waveform shaping a demodulated electrical signal on a preceding stage to be input to the signal branch section 1 and which supplies a demodulated electrical signal having undergone waveform shaping as an input to the signal branch section 1. There can be used a filtering characteristic of the equalizing filter 3a which is basically analogous to that of the equalizing filter 3 shown in FIG. 1.

Thereby, the signal branch section 1 branches the electrical signal having undergone waveform shaping by the equalizing filter 3a (see FIG. 5D in a case where the −3 dB frequency is 16 GHz). One of the branched electrical signals is input to the equalizing filter 2, and the other one of the signals is input to the D flip-flop that corresponds to the data regeneration section 5, by way of the limiting amplifier (LIA) 7.

As mentioned previously, the equalizing filters 2, 3a are low-pass filters which differ from each other in terms of the −3 dB frequency but are analogous to each other in view of the shape of a pass band. The −3 dB frequency (i.e., a frequency band) YGHZ of the equalizing filter 3a is set so as to become higher than the −3 dB frequency (i.e., a frequency band) XGHz of the equalizing filter 2 (X<Y). Therefore, the pass band of the equalizing filter 3a encompasses the entire frequency band of the equalizing filter 2. Accordingly, even when the electrical signal having undergone filtering performed by the equalizing filter 3a is further subjected to filtering performed by the equalizing filter 2, a signal suitable for extracting a clock signal can be obtained as in the case shown in FIG. 1.

For instance, in a case where the −3 dB frequency of the equalizing filter 2 is set to 9 GHz, even when the signal input to the equalizing filter 2 is the electrical signal having passed through the equalizing filter 3a, the equalizing filter 2 can output an electrical signal having a waveform characteristic as shown in FIG. 5A. As a result, the clock recovery circuit 4 can also extract a highly precise clock signal as in the previous case illustrated in FIG. 1.

The signal regeneration device 10B shown in FIG. 6B differs from the signal regeneration device 10 shown in FIG. 1 in that the equalizing filter 3 is omitted. In other respects, the signal regeneration devices 10 and 10B are basically analogous to each other. In FIG. 6B, the same reference numerals designate essentially the same elements shown in FIG. 1.

Specifically, in the signal regeneration device 10B configured as mentioned above, at least the signal branch section 1 branches the input electrical signal into a signal used for regenerating data and a signal used for recovering a clock signal. Hence, the equalizing filter 2 performs filtering for acquiring a signal waveform suitable for extracting a clock signal. Meanwhile, the signal that is to be input to the D flip-flop can be prevented from undergoing filtering performed by the equalizing filter 2. Accordingly, a drop in receiving quality can be prevented while the recovery accuracy of the clock signal is made highly accurate.

In the signal regeneration devices 10, 10A, and 10B shown in FIGS. 1, 6A, and 6B, the limiting amplifier 6 is provided on the stage preceding the clock recovery circuit 4, and the limiting amplifier 7 is disposed on the stage preceding the data regeneration section 5. The present invention is not limited to this configuration, and the limiting amplifier(s) can be omitted as required.

Figure 8:
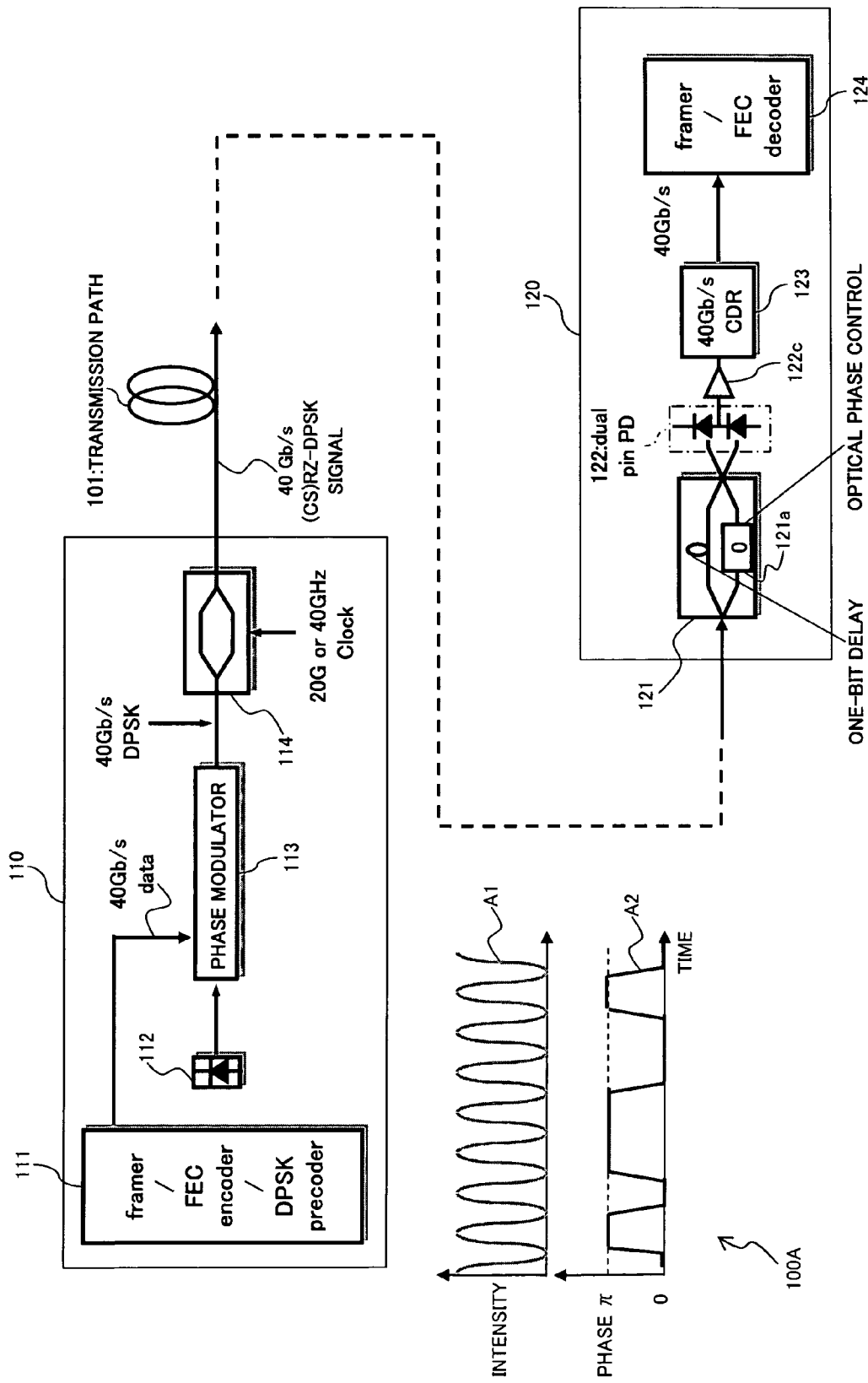
FIG. 8 is a block diagram showing an example configuration of an optical transponder system for transmitting and receiving an optical signal by adoption of a 40 Gb/s RZ-DPSK or CSRZ-DPSK modulation scheme.

The signal regeneration devices 10, 10A, and 10B shown in FIGS. 1, 6A, and 6B have been described in detail by reference to the case where the signal regeneration devices are applied to the optical receiver of DQPSK scheme. However, the present invention is not limited to this case. For instance, as in the case of the DPSK scheme shown in FIG. 8, the signal regeneration device can also be used in a case where the optical receiver of a differential phase shift keying modulation other than DQPSK regenerates a data signal and a clock signal.

By means of disclosure of the embodiment, the signal regeneration device of the present invention can be manufactured.

What is claimed is:

1. A signal regeneration device comprising:
 a branch section which branches an input electrical signal which has been demodulated from a differential phase-shift modulated state, to thereby provide branched demodulated electrical signals;
 a first filter which performs an equalizing process of cutting high frequency components in a waveform of one of the branched demodulated electrical signals, to thereby provide an NRZ-like waveform equalized branched demodulated electrical signal;
 an NRZ clock recovery section which recovers a clock signal from the NRZ-like waveform equalized branched demodulated electrical signal;
 a second filter which subjects to waveform shaping a remaining one of the branched demodulated electrical signals, wherein the second filter has a characteristic of making an eye opening of the remaining one of the branched demodulated electrical signals greater than an eye opening of the NRZ-like waveform equalized branched demodulated electrical signal; and
 a data regeneration section which regenerates a data signal from the waveform shaped remaining one of the branched demodulated electrical signals and the clock signal recovered by the NRZ clock recovery section.

2. The signal regeneration device according to claim 1, further comprising:
 a third filter which subjects to waveform shaping the input electrical signal before being branched by the branch section.

3. The signal regeneration device according to claim 2, wherein the first filter and the second filter are low-pass filters, and the first filter has a characteristic of having a −3dB frequency which is lower than that of the second filter.

4. The signal regeneration device according to claim 3, wherein the second filter is a low-pass filter having a characteristic of having a −3dB frequency, which is higher than that of the first filter but lower than a frequency equivalent to a bit rate of the regenerated data signal.

5. The signal regeneration device according to claim 1, wherein the first filter is a filter having a characteristic of being able to extract a sequence of identical signs from said one of the branched demodulated electrical signals.

6. The signal regeneration device according to claim 5, wherein the first filter and the second filter are low-pass filters, and the first filter has a characteristic of having a −3dB frequency which is lower than that of the second filter.

7. The signal regeneration device according to claim 6, wherein the second filter is a low-pass filter having a characteristic of having a −3dB frequency, which is higher than that of the first filter but lower than a frequency equivalent to a bit rate of the regenerated data signal.

8. The signal regeneration device according to claim 1, wherein the first filter and the second filter are low-pass filters, and the first filter has a characteristic of having a −3dB frequency which is lower than that of the second filter.

9. The signal regeneration device according to claim 8, wherein the second filter is a low-pass filter having a characteristic of having a −3dB frequency which is higher than that of the first filter but lower than a frequency equivalent to a bit rate of the regenerated data signal.

10. An optical receiver comprising:
 a delay interference section which processes an optical signal having been subjected to differential phase-shift modulation;
 a photoelectric conversion detection section which subjects to photoelectric conversion detection the optical signal processed by the delay interference section, thereby outputting an electrical signal demodulated from a differential phase-shift modulated state;
 a branch section which branches the demodulated electrical signal output from the photoelectric conversion detection section, to thereby provide branched demodulated electrical signals;
 a first filter which performs an equalizing process of cutting high frequency components in a waveform of one of the branched demodulated electrical signals, to thereby provide an NRZ-like waveform equalized branched demodulated electrical signal;
 an NRZ clock recovery section which recovers a clock signal from the NRZ-like waveform equalized branched demodulated electrical signal;
 a second filter which subjects to waveform shaping a remaining one of the branched demodulated electrical signals, wherein the second filter has a characteristic of making an eye opening of the remaining one of the branched demodulated electrical signals greater than an eye opening of the NRZ-like waveform equalized branched demodulated electrical signal; and
 a data regeneration section which regenerates a data signal from the waveform shaped remaining one of the branched demodulated electrical signals and the clock signal recovered by the NRZ clock recovery section.

11. A signal processing method comprising:
 branching an electrical signal demodulated from a differential phase-shift modulated state, to thereby provide branched demodulated electrical signals;
 first filtering a waveform of one of the branched demodulated electrical signals by cutting high frequency components in the waveform, to thereby equalize the waveform and provide an NRZ-like waveform equalized branched demodulated electrical signal;
 recovering an NRZ clock signal from the NRZ-like waveform equalized branched demodulated electrical signal;
 second filtering a remaining one of the branched demodulated electrical signals to waveform shape the remaining one of the branched demodulated electric signals, wherein said second filtering has a characteristic of making an eye opening of the remaining one of the branched demodulated electrical signals greater than an eye opening of the NRZ-like waveform equalized branched demodulated electrical signal; and regenerating a data signal from the waveform shaped remaining one of the branched demodulated electrical signals and the recovered NRZ clock signal.

* * * * *